Jan. 7, 1969 W. J. KERWIN 3,420,947
TELEGRAPH SYSTEM WITH SIMULTANEOUS MESSAGE TRANSMISSION AND POLL FOR ANSWER-BACK ARRANGEMENT
Filed May 11, 1965 Sheet 1 of 4

INVENTOR
WALTER J. KERWIN
BY E. F. Kane
ATTORNEY

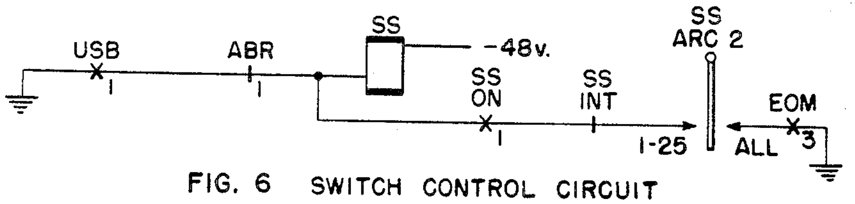
FIG. 6 SWITCH CONTROL CIRCUIT
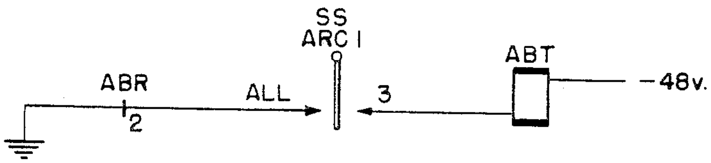
FIG. 7 ANSWER BACK TRIP CIRCUIT
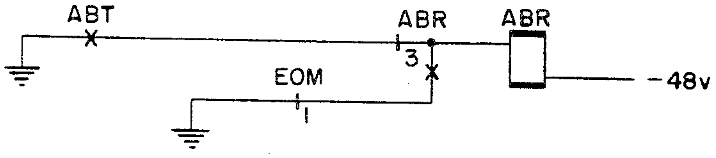
FIG. 8 ANSWER BACK RELAY CIRCUIT
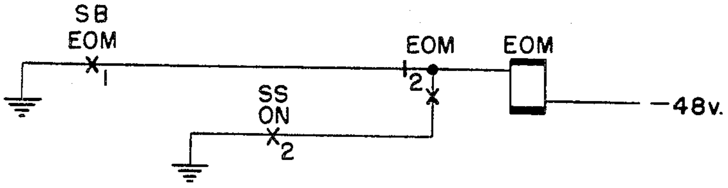
FIG. 9 END OF MESSAGE CIRCUIT
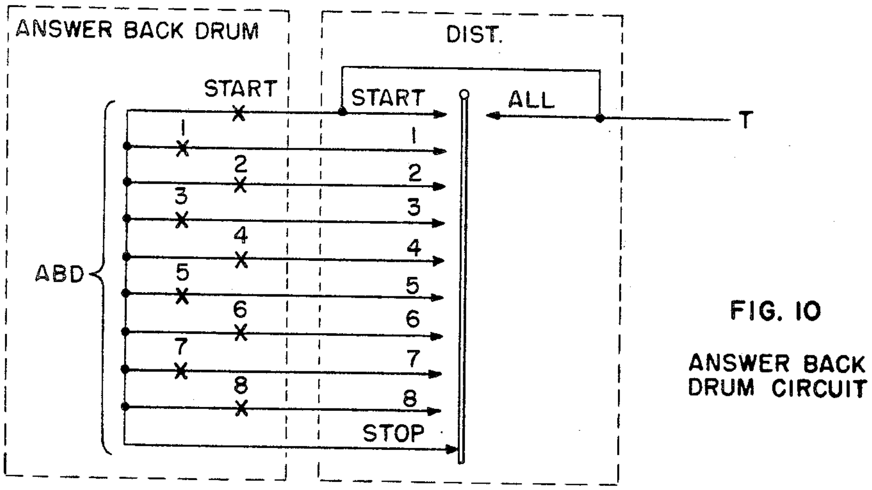
FIG. 10 ANSWER BACK DRUM CIRCUIT United States Patent Office 3,420,947

Patented Jan. 7, 1969

3,420,947

TELEGRAPH SYSTEM WITH SIMULTANEOUS MESSAGE TRANSMISSION AND POLL FOR ANSWER-BACK ARRANGEMENT

Walter J. Kerwin, Mount Prospect, Ill., assignor to Teletype Corporation, Skokie, Ill., a corporation of Delaware Filed May 11, 1965, Ser. No. 454,807
U.S. Cl. 178—3 14 Claims
Int. Cl. H04l 15/00

ABSTRACT OF THE DISCLOSURE

A full duplex, automatic selective calling telegraph system operates to provide a positive, individual answer-back, during message transmission, from all receiving stations selected in response to either individual or group addresses. The transmitting station has a pair of selective control units, one responsive to transmitted signals and the other responsive to received signals, for controlling a relay logic circuit which compares the transmitted call-directing codes with the received answer-back codes. Each receiving station supplies its answer-back code during a different predetermined character of the message text being transmitted.

In the past there have been numerous telegraph switching systems wherein a sending or master station could be selectively connected to a plurality of receiving or way stations connected to the sending station in a full duplex arrangement. In such systems its was the usual practice to effect the connections to selected ones of the stations on the full duplex circuit by sending special codes of signals, known as call directing codes of CDC's over one line of the duplex circuit. These call directing codes, comprising distinctive sequences of code combinations, enable, for message reception, those receiving or way stations to which the sequences have been allotted or assigned as addresses and each receiving station upon being enabled transmits back to the sending station a code combination indicating the enablement of a receiving station. In these prior known systems, all call directing codes and the responses, in the form of an answer-back code, from all of the receiving stations would be transmitted before the start of the message transmission. In the event that several receiving stations were enabled in response to a single "group" call directing code, no satisfactory provisions existed for receiving positive answer-back codes from all of the called stations. Usually, only one of the stations selected in response to a "group" CDC provided an answer-back code; so that it was not possible to ascertain whether or not all of the called stations had responded.

It is an object of the present invention to ascertain, during the message transmission time interval, whether or not called stations on a telegraph system responded to their call directing codes.

Another object of the invention is to determine, during message transmission, whether or not any stations on a telegraph circuit responded and received messages although their call directing codes were not transmitted.

A still further object of the invention is to provide a simple, telegraph transmission system wherein a sending station may simultaneously transmit a message text and poll the stations which it has called to ascertain whether or not the called stations responded to their call directing codes.

Yet another object of the invention is to provide a telegraph system, wherein a calling station selectively establishes communication with one or more called stations by transmitting call directing codes over the system, with a polling arrangement for determining whether or not any stations on the system, the call directing codes of which were not transmitted, have inadvertently had communication established to them.

In accordance with one embodiment of the invention a sending station and a plurality of receiving stations are connected in a full duplex arrangement. The sending or transmitting station has a pair of selective control units, one responsive to transmitted signals and the other responsive to received signals, for controlling call and answer logic circuits which compare call directing codes transmitted by the sending station with answer-back codes received in the sending station and transmitted from the receiving station. Each of the receiving stations is equipped with an answer-back mechanism and a selective control unit. The selective control unit in each receiving station responds to its individual or group call directing code and after all of the call directing codes have been transmitted the sending station transmits a start-of-message code combination which enables the receiving stations to print any message text transmitted by the sending station.

Each receiving station is provided with a stepper switch to which a stepping pulse is directed from the selective control unit in the receving station upon the receipt of each code combination in the message text. The stepper switches in the respective receiving stations are coded to sequentially trip the answer-back mechanisms in the receiving stations whereby a distinctive answer-back signal comprising a single code combination will be sent back to the transmitting station each time a code combination comprising part of the message text is received in the receiving stations.

The call and answer logic at the sending station comprises two banks of relays operated under control of the selective control units in the sending station. The relays in one of these banks are individually assigned to each receiving station and are energized selectively, by one of the selective control units upon transmission of call directing codes assigned to their receiving stations, to prepare an alarm circuit. These alarm circuits are disabled by the other selective control unit responding to answer-back signals from the receiving stations. The relays of the second bank are also individually assigned to each receiving station and are arranged to be energized when an answer-back signal is received from a receiving station, the call directing code of which was not transmitted by the sending station. At the end of the message text an end-of-message code combination signal is transmitted to restore all of the receiving stations to condition to be selected for receipt of a message and this end-of-message signal causes the selective control unit at the sending station which responds to transmitted signals, to operate the alarms to indicate those receiving stations that should have received the message text and did not and to indicate those stations that received the message but should not have done so.

A more complete understanding of the invention may be had by reference to the following detailed description of the system when considered in conjunction with the accompanying drawings wherein.

FIGS. 6 to 10, inclusive, are circuit diagrams of the apparatus at the receiving station showing the stepper switch control circuit, answer-back trip circuit, answer-back relay circuit, end-of-message circuit and answer-back drum circuit, respectively.

Figure 1:
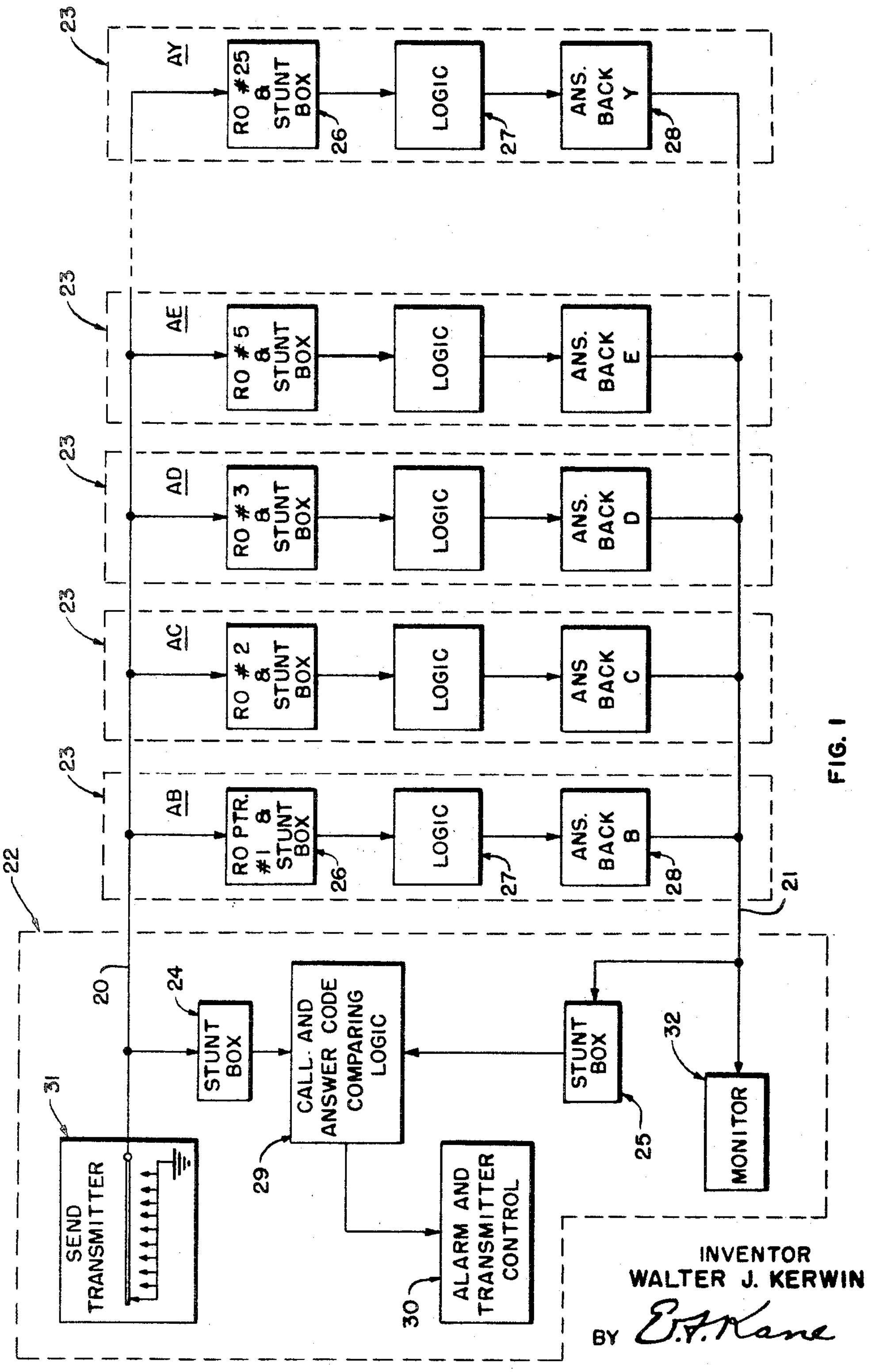
FIG. 1 is a block diagram showing the entire system and its components schematically.

In FIG. 1 there is shown schematically a two-way or duplex telegraph transmission system represented by the lines 20 and 21 with a sending station 22 at one end of the lines and a plurality of receiving or outlying stations 23 connected in the duplex lines. As may be readily understood by those skilled in the art, any suitable number of outlying or receiving stations 23 may be connected to the system the receiving channel of which is the line 21 and the transmitting channel of which is the line 20. In the present disclosure the system is illustrated as including twenty-five receiving or outlying stations 23 to which impulses may be transmitted over the line 20 simultaneously with the transmission of impulses from the receiving stations 23 to the sending station 22 over line 21. Only five of the receiving stations 23 are fully illustrated and these stations have been assigned addresses AB, AC, AD, AE and AY, respectively. As shown in FIG. 1 the full duplex channel is illustrated by the two full metallic one-way telegraph circuits or lines 20 and 21. This has been done so that the invention may be more readily understood without the further complications of the various types of transmission circuits commonly employed in telegraph networks for furnishing full duplex telegraph service between various stations. It is to be understood, however, that these lines or circuits may include any of the usual types of circuits capable of providing this type of service and consequently no detailed description of them is given herein.

At the sending station there are also provided a pair of multiple code sequential selectors or selective control units 24 and 25 which may be of the type disclosed in the United States patent to W. M. Bacon et al. No. 2,766,318, issued Oct. 9, 1956, or may be of the type shown in the United States patent to W. J. Zenner No. 2,667,533, issued Jan. 26, 1954. These selectors or selective control units 24 and 25 are commonly known as "stunt boxes" and will be so designated herein. The stunt box 24 operates under control of signals transmitted over the line 20 and the stunt box 25 operates under control of signals transmitted over the line 21. Thus, stunt box 24 is on the sending side of the duplex circuit while stunt box 25 is on the receiving side. The stunt box 24 will respond to call directing codes representing the addresses of the outlying stations 23 to operate contacts associated with call directing codes on the line 20. Similarly, stunt box 25 will respond to answer-back codes individual to the sending stations.

Each of the receiving stations 23 is equipped with a receive-only printer 26, which preferably is of the type disclosed in the United States patent to W. J. Zenner No. 2,505,729, issued Apr. 25, 1950, and this printer is equipped with a stunt box such as that shown in the United States patent to W. J. Zenner, No. 2,667,533, issued Jan. 26, 1954, for controlling circuit logic illustrated diagrammatically at 27 in FIG. 1 which in turn controls the answer-back mechanism 28. The receiving stations 23, as pointed out hereinbefore, have the addresses AB, AC, AD, AE . . . AY and upon being enabled for operation will sequentially send back answer-back code combinations B, C, D, E . . . Y under the control of the circuit logic 27. Since in the present disclosure it has been assumed that there are only 25 receiving stations, the recognition of the enablement of these stations may comprise a code combination representative of a single character within the alphabet. These answer-back mechanisms are arranged to transmit over the line 21 to a monitor printer 32 which may be of any desired type and to the stunt box 25 of the transmitting station 22. The outputs of the stunt boxes 24 and 25 control call and answer code comparing logic 29 which in turn controls the operation of alarm and transmitter control devices 30. The apparatus at the sending station 22 for transmitting code combinations of signals over the line 20 may comprise a keyboard transmitter 31 such as that shown in United States Patent No. 2,607,848, issued to W. J. Zenner on Aug. 19, 1952 or a transmitter of the type shown in United States Patent No. 2,348,214, issued on May 9, 1944 to E. A. Gubisch.

Figure 2:
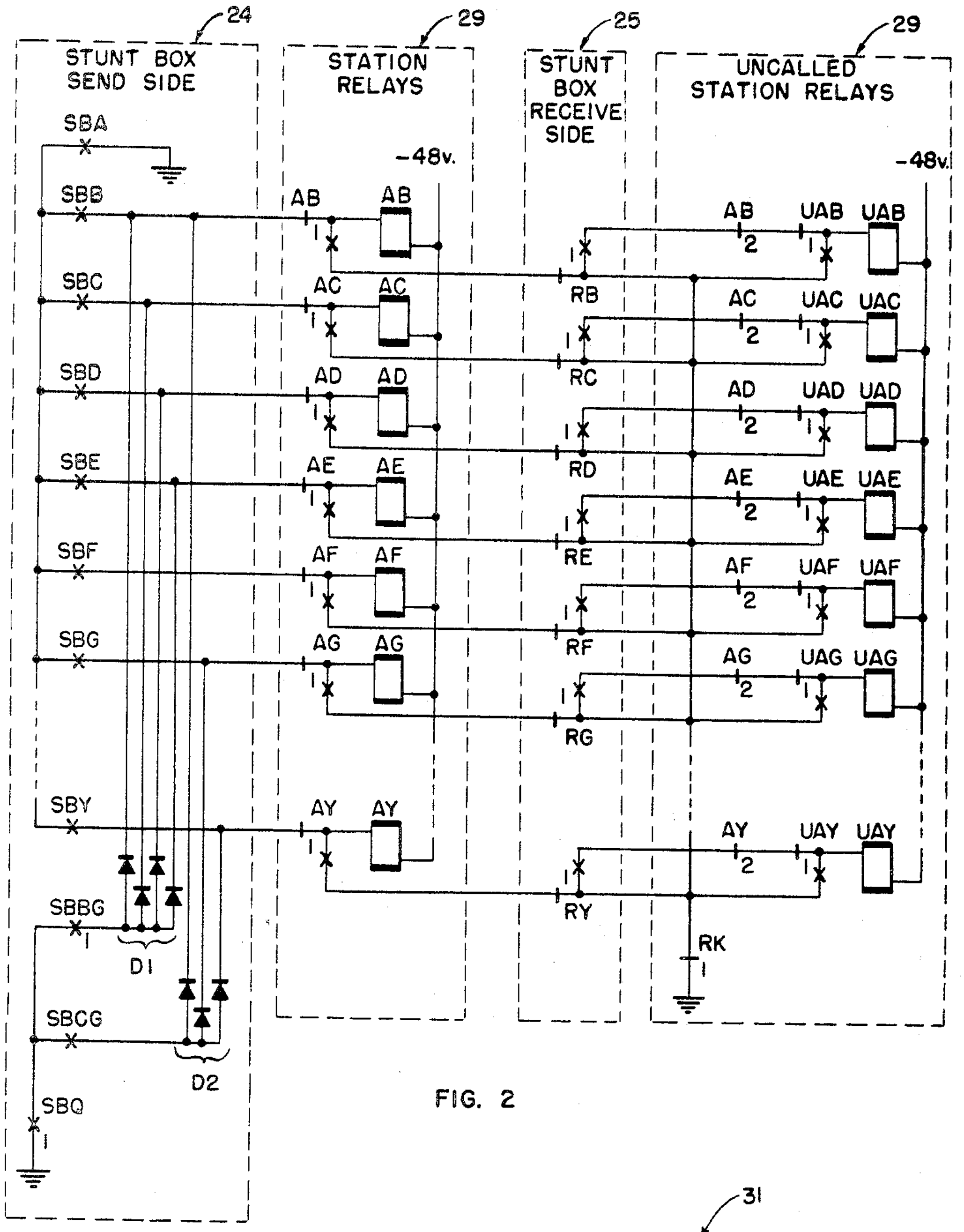
FIG. 2 is a circuit diagram of the call and answer logic including the selective control units or stunt boxes at the sending station.
Figure 5:
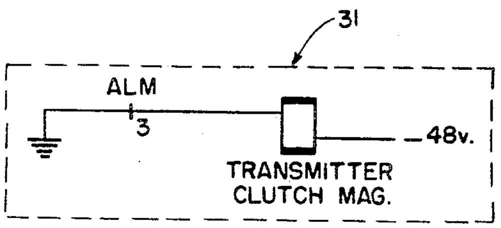
FIGS. 3, 4 and 5 are circuit diagrams of the alarm and transmitter controls at the sending station, FIG. 3 showing the alarm circuit for indicating the stations which should have but did not receive the message text, FIG. 4 showing the alarm circuit for indicating the stations that received the message text but should not have received it, and FIG. 5 showing the transmitter control circuit.

In the diagrammatic disclosure of the circuitry shown in block diagram in FIG. 1 and illustrated in detail in the other figures of the drawings the "detached contact" method of exposition used in United States Patent No. 2,722,675, granted to J. Michal et al. on Nov. 1, 1955, has been adopted for use. In this method of exposition relay contacts generally are not adjacent to their magnetic cores and windings but are separated or detached therefrom. For example, a core such as the station relay core AB shown in FIG. 2, is represented by a small rectangle and given a functional designation such as AB. This represents the address of one of the receiving stations. In the specification the relay is referred to as "2–AB," where "2" indicates the figure number of the drawing on which the core of the relay is located, "AB" signifies that this relay, in the call and answer comparing logic at the transmitting station, is the relay in that circuit logic associated with the receiving station having the address AB. On the drawings each of the contacts controlled by the relay and shown on the same figure with the winding is given a designation such, for example, as AB–2 placed in proximity to the contacts, where "AB" indicates the address of the called station and that the contacts are controlled by the winding of the relay AB located on the same figure. When the relay contacts are located on another figure of the drawings, the contacts are given a compound designation such, for example, as "2–AB–1." In the specification the contact may be referred to as 3–2–AB–3 where "3" indicates the figure number of the drawing on which the contacts are located, "2" indicates the figure number of the drawing on which the core is located, "AB" is the function designation, and "3" is the contact number.

Contacts which are closed when the relay is deenergized and known as "break" contacts are represented by a short line perpendicular to the line representing the conductor, while contacts which are closed when the relay is energized and known as "make" contacts are represented by two short cross lines diagonally intersecting the conductor line. The contacts in the stunt boxes are designated in a manner similar to that designating the relay contacts. Rotary selectors, or stepper switches as they are sometimes called, are shown with their operating coils and core illustrated in the same manner as the coils of relay and with their interrupter and off-normal contacts shown in the manner similar to that used in connection with that used with relays. That is, the common brush or rotor of the switch is in each case designated "all" whereas the various contacts with which the rotor or brush will engage in stepping across the row of contacts associated with it, are given reference numbers indicating the sequence in which the rotor will contact them. These stepper switches are of the type which step their wipers or brushes when their operating magnets are released or deenergized. Each of these switches open their interrupter contact each time they are energized and close their off-normal contacts in all except the home or normal position. All normally open and normally closed contacts of keys or push buttons are shown in a manner similar to that used in designating relay contacts. The answer-back drum arrangement is illustrated in a similar manner in that its contacts with the exception of its stop contact are illustrated in the manner of normally open relay contacts and the symbol for transmitters and distributors is that in common usage in the art.

When the system is in its dormant condition, that is, no messages are being processed by it, all of the receive-only printers 26 in the receiving stations 23 will be in a select non-print condition, that is, they will be in condition to be selected for receipt of a message under control of their respective stunt boxes. Upon the transmission of call directing codes over the sending line 20 from the sending transmitter 31, which may be of the type mentioned hereinbefore, the outlying or receiving stations 23 will be selectively prepared to receive another code combination which will enable them for reception of a message text. The call directing codes used in this system consist of the code combinations for two letters and the code combination for "letters." In the system being illustrated herein, the code combination for the addresses AB, AC, etc. followed by the code combination for "letters" comprise these call directing codes, for example AB↓, AC↓, AF↓ . . . Ay↓.

Referring now to FIG. 2 the stunt box 24 on the send side of the duplex line has a contact 2–SBA in it which is arranged to respond to the code combination for the letter A when the send station is in the select non-print condition and to remain operated until the "letters" code combination is sent by the transmitter 31. As each call directing code comprising the letter "A" and one of the succeeding letters in the alphabet plus the "letters" character is transmitted the stunt box contact 2–SBA will, as mentioned hereinbefore, be closed and will lock closed while the code combination representative of the second character of the call directing code is transmitted to effect the closure of the contact 2–SBB. With contact 2–SBA closed the transmitter 31 in sending a code combination for another character, for example the combination for the letter B, will cause the stunt box 24 to close contact 2–SBB and a circuit will be completed to energize station relay 2–AB. This circuit will extend from ground at relay 2–SBA, now closed, contact 2–SBB, now closed, normally closed transfer contact 2–AB–1 and winding of station relay 2–AB to −48 volts source. As soon as the station relay 2–AB is energized it will close its normally open transfer contact 2–AB–1 to complete a locking circuit through normally closed contact 2–RB in the receive side stunt box 25 and through normally closed reset key 2–RK–1 to ground. As soon as the "letters" code combination of the call directing code is transmitted, stunt box contact 2–SBA will open and since the contact 2–SBB is only momentarily closed, these two contacts will be opened and relay 2–AB will be held energized over its locking path. When the next call directing code, for example, call directing code "AD↓" for the receive station 23 having the address "AD" is transmitted, the contact 2–SBA will be closed and held closed until the "letters" code combination of the call directing code is transmitted. While the stunt box contact 2–SBA is held closed the code combination for the letter "D" in being transmitted will cause stunt box contacts 2–SBD to be momentarily closed to energize station relay 2–AD over a circuit similar to that described for station relay 2–AB. This relay will be held operated over a locking circuit similar to that described in connection with station relay 2–AB and will remain locked up through ground at reset key 2–RK–1.

At this time it will be assumed that any other of the receiving stations 23 that are to receive the message text will have had their call directing codes transmitted and will have had their associated station relays in the call and answer code comparing logic 29 locked up in a similar manner.

As the call directing codes are transmitted over the line 20, those receiving stations 23 whose call directing codes are transmitted by the transmitter 31 will be prepared for the reception of a message text and upon receipt of a start of message signal in the form of a selected combination of permutation code signals such, for example, as "letters," "carriage return," "line feed" and "letters" will be switched from their select non-print condition to their print non-select condition. In other words, these stations will no longer respond to call directing codes which might by accident form part of a message text but will print the characters and perform functional operations under control of code combinations that are transmitted from the sending station 22. A series of call directing codes such as "AB letters," "AC letters," and "AD letters," etc. may be transmitted from the sending station 22 to select the respective stations 23 on the duplex line for the reception of a message to be transmitted and all of the stations whose call directing codes are thus transmitted will be prepared to shift to a printing condition upon receipt of the "start of message" signal.

In the event that some groups of stations on the line normally receive certain types of messages, group address codes may be transmitted such, for example, as "QB" or "QC," the "Q" code combination indicating that a group address code is to be transmitted and when the code combination for the character "Q" is followed by the code combination for the character "B," a group of receiving stations may be selected through their stunt boxes to receive this message and simultaneously with the transmission of these group address codes, the station relays associated with those stations in the groups will be energized. When the stunt box 24 on the send side of the line recognizing the character "Q," it will close contact 2–SBQ and will hold that contact closed until a "letters" code combination is transmitted. If a group of stations 23 having the addresses AB, AC, AD and AE are to receive the message, the second character of the call directing code for a group address will be the character "B" and the stunt box 24 on the send side of the line will recognize this character and close its group contact 2–SBBG–1 to connect ground through contact 2–SBQ–1 now closed and the momentarily closed contact 2–SBBG–1 and the group of diodes D–1 to station relays 2–AB, 2–AC, 2–AD, and 2–AE to energize these relays and lock them up to ground at the reset key 2–RK–1, over locking paths similar to those described hereinbefore. If the group to which it is desired to send the message comprises, for example, those receiving stations 23 having addresses AB, AG and AY the call directing code "QC letters" may be transmitted to prepare the receiving stations 23 having the addresses AB, AG and AY to receive the message and relays 2–AB, 2–AG and 2–AY will be energized through their associated diodes D–2.

From the foregoing it will be apparent that the stunt box 24 in the sending station is arranged so that the first call directing code character transmission will cause a contact in the stunt box to close and latch operated until the "letters" character of the call directing code is sent. The second call directing code character transmission will momentarily close its associated stunt box contact. The combination of these two contact closures will apply ground to the station relay associated with the transmitted call directing code and also associated with the receiving station 23 whose address forms part of the call directing code. When a group address code is transmitted several of the station relays may be locked up simultaneously as described in detail hereinbefore. Any of those station relays 2–AB through 2–AY which have been energized will lock to ground at the reset key 2–RK–1 through individual contacts in the stunt box 25 on the receive side of the duplex line. In other words, through contacts 2–RB, 2–RC, 2–RD, etc. associated with relays 2–AB, 2–AC, 2–AD, etc.

The receiving stations 23 upon receipt of their call directing codes such as AB, AC, AD, etc. will be selectively prepared to accept a start-of-message code and, upon receipt of its call directing code and the start of message code, each station will be ready to receive message text since its printer 26 will be shifted from the select non-print condition to the print non-select condition and will remain in this condition until restored to normal or dormant condition by the receipt of an end-of-message code after the message text has been transmitted. When a receiving station 23 is in the print condition its stunt box will respond to each character of message text received at the station and in so responding will close a universal stunt box contact 6–USB–1. Closure of this normally open contact 6–USB–1 in any receiving station will complete a circuit from ground through normally closed contacts 6–8–ABR–1 of an answer-back relay 8–

ABR through the stepper switch operating magnet 6–SS to a −48 v. source. As soon as the circuit is completed to the stepper switch magnet 6–SS it will close its off normal contacts 6–SS–ON–1 to prepare a circuit to contacts 1 through 25 of one of the arcs of contacts in it at 6–SS–ARC–2. The closure of the universal stunt box contact 6–USB–1 is only momentary and consequently the stepper switch 6–SS will be operated and released to cause it to move from its normal position to its off normal position thereby closing normally open contacts 6–SS–ON–1. Each of the receiving stations 23 is provided with a stepper switch and the stepper switches of all of the receiving stations will step in unison upon receipt of each character of the message text until the answer-back relay 8–ABR in that particular station is operated to open its normally closed contact 6–8–ABR–1.

In the present disclosure it has been assumed, for the sake of simplicity, that there are only twenty-five receiving stations in the system whereby a code combination representative of a single character within the alphabet may be used for individual answer-back signals. Consequently, the stepper switches in the receiving stations 23 have twenty-five contacts in each arc. Each stepper switch has two arcs of contacts and, as illustrated in FIG. 7 wherein the answer-back trip circuit for the receiving station 23 having the address "AD" is shown, one contact 7–SS–ARC–1 on the number one arc, that is the third contact, is connected to the winding of an answer-back trip magnet 7–ABT. All of the contacts 1 to 25 of the other arc, i.e. the contacts on 6–SS–ARC–2 are strapped together. Similarly, the number two arc 6–ARC–2 in each receiving station 23 has its contacts 1 to 25 strapped together and the number one arc 7–ARC–1 in each receiving station has a single contact connected to its answer-back trip magnet 7–ABT. Each receiving station 23 has a different contact on its stepper switch 7–ARC–1 connected to its answer-back trip magnet 7–ABT whereby the receiving stations 23 will have their answer-back magnets 8–ABR operated in succession.

As the answer-back relays 8–ABR in the various receiving stations 23 operate they will break the operating circuit for stepper switch magnets 6–SS in their respective stations by opening normally closed contacts 6–8–ABR–1. Consequently, the stepper switches 6–SS will stop stepping until, at the end of the message text, the transmitting station 22 transmits an end-of-message code combination to all of the receiving stations. This code combination will be received in the stunt boxes of printers 26 which, upon recognition of this code will close their stunt box, end-of-message contacts 9–SB–EOM–1, to energize end-of-message relays 9–EOM in each station 23 over circuits from ground through normally open, now closed, contacts 9–SB–EOM–1, normally closed contacts 9–EOM–2 of end-of-message relays 9–EOM, through the relays 9–EOM to −48 v. source. This will energize the end-of-message relays 9–EOM at all receiving stations 23 and these relays will lock operated over a circuit from ground through the now closed, normally open, off normal contacts 9–6–SS–ON–2 and now closed, normally open, transfer contacts 9–EOM–2, the winding of end-of-message relays 9–EOM to the −48 volt source.

When the end-of-message relays 9–EOM are energized they will close their contacts 6–9–EOM–3 to supply ground to the common brushes of stepper switches 6–SS–ARC–2 to step these brushes back to normal position in a circuit from ground (FIG. 6) through now closed contacts 6–9–EOM–3, common brush ALL of 6–SS–ARC–2, the remaining ones of contacts 1 to 25 of stepper switch 6–SS–ARC–2, interrupter contacts 6–SS–INT, winding of stepper switch magnet 6–SS to −48 volt source in each station. As soon as a stepper switch 6–SS in any station 23 returns to normal it will reopen its off normal contacts 9–6–SS–ON–2 to break the locking circuit for the end of message relay 9–EOM in that station 23.

The stepper switches in the various receiving stations 23 in stepping across their contacts 7–SS–ARC–1 in unison, under control of universal stunt box contacts 6–USB–1, will sequentially energize the answer-back trip magnets 7–ABT in the respective stations 23. The circuit for energizing the answer-back trip magnet in each station 23 extends from ground (FIG. 7) through normally closed contacts 7–8–ABR–2, the common brush and one of the contacts on stepper switch 7–6–SS–ARC–1, and the winding of the answer-back trip magnet 7–ABT to the −48 volt source in FIG. 7. The answer-back trip magnet 7–ABT will remain energized only momentarily since, in operating, it closes its contacts 8–7–ABT–1 to energize answer-back relay 8–ABR and as soon as answer-back relay 8–ABR pulls up it will open the circuit to answer-back trip magnet 7–ABT at normally closed contacts 7–8–ABR–2.

Upon operation, the answer-back trip magnet 7–ABT will initiate a cycle of operation of an answer-back mechanism as illustrated diagrammatically in FIG. 10 which preferably is of the type shown in the United States Patent No. 3,143,597, issued Aug. 4, 1964. Since the present system uses a single character answer-back signal, the answer-back mechanism at each station will send a single acknowledging code combination in each cycle of operation. The answer-back drum at each receiving station is coded with a code combination for a character different from the character coded on all of the drums at the other receiving stations 23. For example, the receiving station having the call directing code "AE" assigned to it, being the fourth of the series of stations 23, as shown on FIG. 1, will transmit an answer-back code combination comprising the code combination for the letter "E." In an eight-level code the combination for the letter "E" is marking (current) for the first, third, seventh and eighth levels and "spacing" (no current) for the second, fourth, fifth, and sixth levels. Consequently, the answer-back drum at that receiving station 23 assigned the call directing code "AE" would be coded as just described to send the answer-back code "E" to the transmitting or sending station 22. The distributor 10–DIST shown in FIG. 10, under control of the closed contacts 10–ABD–1, 10–ABD–3, 10–ABD–7 and 10–ABD–8 and open contacts 10–ABD–2, 10–ABD–4, 10–ABD–5 and 10–ABD–6 applies the signals to the line 21 and over it to the stunt box or selective control unit 25 at the sending station.

The printers 26 at the receiving stations 23 which have been enabled to receive the message text will, through their circuit logic 27 (shown in FIGS. 6 through 9) activate their answer back mechanisms (FIG. 10) in a predetermined sequence. One of the answer-back mechanisms will be called into operation upon receipt of each character of the message text. When an answer-back mechanism, for example, the mechanism in the receiving station 23 having the address "AE," sends its answer-back signal "E" to the sending station, the stunt box 25 will recognize this code combination and will operate its transfer contact 2–RE–1. Operation of receive stunt box transfer contact 2–RE–1 will open its normally closed contact to break the locking circuit to relay 2–AE and will close its normally open contact.

In the event that station relay 2–AE had been operated, by the transmission over line 20 of the call directing code "AE" or "QE," relay 2–AE will be released. On the other hand if neither the call directing code "AE" or "QE" had been transmitted and the receiving station 23 having the address "AE" assigned to it was accidentally enabled to receive the message text, relay 2–AE would not have been energized to open its normally closed contacts 2–AE–2 and when transfer contact 2–RE–1 is operated relay 2–UAE will be energized. The operating path for relay 2–UAE extends from ground in FIG. 2 through release key 2–RK–1, now closed, normally open contacts 2–RE–1, normally closed contacts 2–AE–2 of unenergized relay 2–AE, normally closed contacts 2–UAE–1, and winding of uncalled station relay 2–UAE to −48 volt source in FIG. 2. When relay 2–UAE, or any of the other uncalled station relays 2–UAB, 2–UAC, etc. is energized it will lock operated to ground at release key 2–RK1 and its transfer contacts, such as normally open contacts 2–UAE–1.

From the foregoing it should be apparent that those receiving stations 23, the assigned call directing codes of which are transmitted by the sending station 22 and that send their answer-back codes back to the sending station, will have their respective station relays 2–AB to 2–AY energized on transmission of the call directing codes and the energized station relays will be deenergized one at a time as the characters of the message text are transmitted. Any receiving station 23 that has its call directing code transmitted but does not return its answer-back code will have its associated station relay, such as relay 2–AB energized but will not release that relay during transmission of the message text. Similarly, the uncalled station relays 2–UAB to 2–UAY, associated with station 23, the call directing codes of which are not transmitted but which accidentally send an answer-back code to the sending station 22, will be energized over the circuits described hereinbefore.

Figures 3, 4:
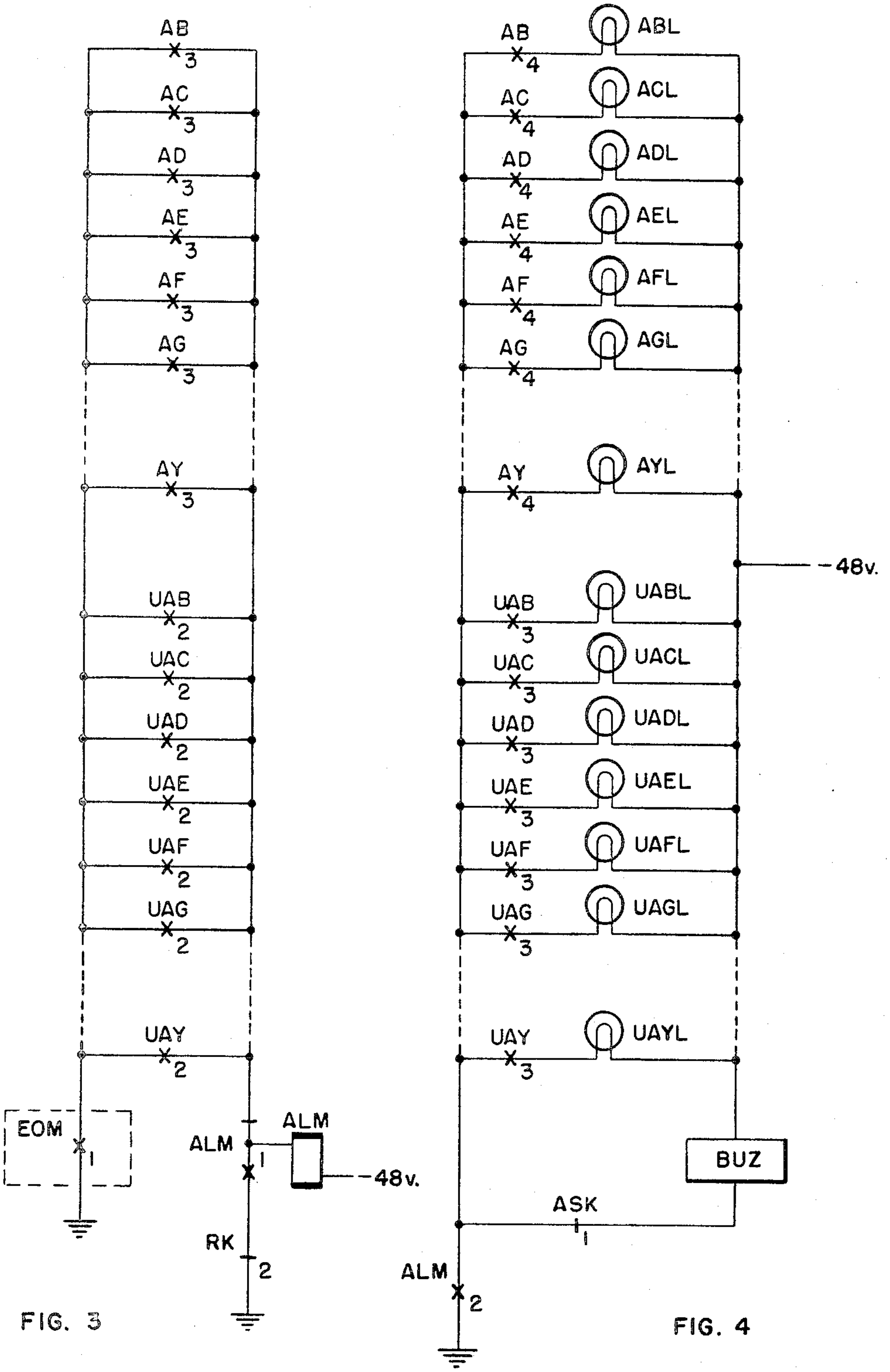

Upon energization of any one of the station relays 2–AB to 2–AY that relay will close its individual alarm contacts in the group of contacts 3–2–AB–3 to 3–2–AY–3 and 4–2–AB–4 to 4–2–AY–4. Similarly, energization of any one of the uncalled station relays 2–UAB to 2–UAY will close its individual alarm contacts 3–2–UAB–2 to 3–2–UAY–2 and 4–2–UAB–3 to 4–2–UAY–3. The contacts 3–2–AB–3 to 3–2–ABY and 3–2–UAB–2 to 3–2–UAY are connected in parallel between normally open end-of-message contacts 3–EOM–1 and normally closed transfer contacts 3–ALM–1. Consequently, if any one of the station relays 2–AB to 2–AY or uncalled station relays 2–UAB to 2–UAY are held energized when an end-of-message code combination is transmitted and recognized by the send stunt box 24, an alarm will be registered. The alarm circuit will be completed from ground (FIG. 3) through closed normally open contact 3–EOM–1, the closed one or ones of normally open contacts 2–3–AB–3 to 2–3–AY–3 or 2–3–UAB–2 to 2–3–UAY–2, normally closed transfer contact 3–ALM–1 and winding of alarm relay 3–ALM to —48 volt source in FIG. 3. When alarm relay 3–ALM is energized it will lock operated in a path from the —48 volt source, winding of the relay 3–ALM, now operated, normally open transfer contacts 3–ALM–1 and a normally closed contact 3–2–RK–2 of reset key 3–2–RK to ground.

Energization of alarm relay 3–ALM will close its normally open contacts 4–3–ALM–2 to supply energizing current to a buzzer 4–BUZ in a circuit from ground through now closed contacts 4–3–ALM–2, normally closed contacts 4–ASK–1 of an alarm silence key 4–ASK, the winding of buzzer 4–BUZ to —48 volt source. A parallel circuit will also be completed, by the energization of alarm relay 3–ALM, from ground (FIG. 4) through contacts 4–3–ALM–2, any one or more of the group of contacts 4–2–AB–4 to 4–2–AY–4 or 4–2–UAB–3 to 4–2–UAY–3 whose associated relays have remained energized, a lamp in the group of station lamps 4–ABL to 4–AYL and a lamp in the group of uncalled station lamps 4–UABL to 4–UAYL to —48 volt source in FIG. 4. Thus, the failure to enable any receiving station, the call directing code of which has been transmitted, or the accidental enablement of any receiving station, the call directing code of which was not transmitted, will be indicated by the operation of the buzzer 4–BUZ and the station and type of fault will be indicated by lighting either a station lamp 4–ABL to 4–AYL or an uncalled station lamp 4–UABL to 4–UAYL.

In addition to actuating the alarm apparatus, the alarm relay 3–ALM will, upon energization, open its normally closed contacts 5–3–ALM–3 to break the operating circuit from ground through the transmitter clutch magnet 5–TCM in the sending transmitter 31.

In the event that only those receiving stations 23, whose call directing codes were transmitted, were enabled to receive the message text, none of the station relays or uncalled station relays will be energized at the time that the end-of-message code combination is transmitted. Consequently, there will be no alarm. However, if any error has occurred its type and location will be registered and the system may then be restored to normal operative condition by operating the reset key 2–RK to open the locking ground path for the station relays and uncalled station relays in FIG. 2 at contacts 2–RK–1 and to open the locking ground path to the alarm relay 3–ALM at contacts 3–2–RK–2. Upon being released the alarm relay 3–ALM will close its contacts 5–3–ALM–3 to condition the transmitter 31 for operation and will open its contacts 4–3–ALM–2 to open the circuit to the alarm lamps in FIG. 4 and to the buzzer 4–BUZ.

Although a particular embodiment of the invention is shown in the drawings and described in the foregoing specification, it will be understood that the invention is not limited to that specific embodiment but is capable of modification and rearrangement and substitution of parts and elements without departing from the scope of the invention.

What is claimed is:

1. In a telegraph transmission system including a sending station and a plurality of receiving stations:
means for selectively connecting selected ones of said receiving stations to receive a message comprising a plurality of characters from said sending station,
means at each of said receiving stations for sending a distinctive answer-back signal to the sending station to acknowledge that it has been connected to receive said message, and
means at the receiving stations for rendering the means for sending an answer-back signal at the receiving stations operative one at a time in response to receipt of successive characters of the message.

2. In a telegraph transmission system:
a sending station;
a plurality of receiving stations;
means in said sending station for transmitting signals to said receiving stations;
means at each receiving station for recognizing certain of said signals to prepare that station for reception of the signals of a message text;
means at each receiving station for transmitting an acknowledging signal to the transmitting station; and
means, at the receiving stations, activated by the receipt of the signals of the message text, for actuating the acknowledging signal transmitting means at the respective receiving stations in a predetermined sequence.

3. In a telegraph transmission system:
a sending station;
a plurality of receiving stations;
a pair of transmission channels between said transmitting station and said receiving stations;
means in said sending station for transmitting signals over one of said channels to said receiving stations;
means at each receiving station for recognizing certain of said signals to prepare that station for reception of the signals of a message text;
means at each receiving station for transmitting an acknowledging signal over the other of said channels to the transmitting station; and
means, at the receiving stations, activated by the receipt of the signals of the message text, for actuating the acknowledging code transmitting means at the respective receiving stations in a predetermined sequence.

4. In a telegraph transmission system:

a sending station;
a plurality of receiving stations;
a full duplex circuit comprising a pair of transmission channels connecting said transmitting station to all of said receiving stations;
means in said sending station for transmitting signals over one of said channels to said receiving stations;
means at each receiving station for recognizing a call directing signal to prepare that station for reception of the signals of a message text;
means at each receiving station for transmitting an answer-back signal over the other of said channels to the transmitting station; and
means, at the receiving stations, activated by the receipt of the signals of the message text, for actuating the answer-back transmitting means at the respective receiving stations in a predetermined sequence.

5. In a telegraph transmission system:
a sending station;
a plurality of receiving stations;
a pair of transmission channels between said transmitting station and said receiving stations;
a signal generator in said sending station for transmitting signals over one of said channels to said receiving stations;
means at each receiving station for recognizing call directing codes included in said signals to prepare that station for reception of the signals of a message text;
a signal generator at each receiving station for transmitting an answer-back signal over the other of said channels to the transmitting station; and
means, at the receiving stations, activated by the receipt of the signals of the message text, for actuating the signal generator at the respective receiving stations in a predetermined sequence.

6. In a telegraph transmission system:
a sending station;
a plurality of receiving stations;
a pair of transmission channels between said transmitting station and said receiving stations;
means in said sending station for transmitting signals over one of said channels to said receiving stations;
means at each receiving station for recognizing certain of said signals to prepare that station for reception of the signals of a message text;
means at each receiving station for transmitting an acknowledging signal over the other of said channels to the transmitting station;
means, at the receiving stations, activated by the receipt of the signals of the message text, for actuating the acknowledging signal transmitting means at the respective receiving stations in a predetermined sequence;
a first selective control unit, at the sending station and operated by signals transmitted from the sending station, to establish circuit conditions indicating that selected ones of said certain signals have been transmitted; and
a second selective control unit, at the sending station and operated by signals from actuated ones of the acknowledging signal transmitting means, to disestablish each of the circuit conditions previously established.

7. In a telegraph transmission system including a sending station and a plurality of receiving stations:
a transmitter at the sending station;
means responsive to call directing codes transmitted by said transmitter for selectively connecting selected ones of said receiving stations to receive a message text comprising a plurality of characters from said transmitter at said sending station;
answer-back signal generating means at each of said receiving stations for sending a distinctive answer-back signal to the sending station to acknowledge that the receiving station has been connected to receive said message; and
a selective control unit at the receiving stations for rendering the answer-back signal generating means at the receiving stations operative one at a time in response to receipt of successive characters of the message text.

8. In a telegraph transmission system including a sending station and a plurality of receiving stations:
means for selectively connecting selected ones of said receiving stations to receive a message comprising a plurality of characters from said sending station;
answer-back signal generating means at each of said receiving stations for sending a distinctive answer-back signal to the sending station to acknowledge that the receiving station has been connected to receive said message;
means at the receiving stations for rendering the answer-back signal generating means at the receiving stations operative one at a time in response to receipt of successive characters of the message, said means for rendering the answer-back signal generating means operative comprising:
an answer-back trip means for initiating a cycle of operation of said answer-back signal generating means,
stepping means having a plurality of outputs for sequential energization for operating the trip means, a different one of said outputs in the sequence being individual to the trip means in each different receiving station, and
a selective control unit for actuating all of said stepping means one step for each character of message text received at a receiving station; and
means at the sending station in response to the operated answer-back signals for indicating which of the receiving stations has been connected to receive the message.

9. In a telegraph transmission system including a sending station and a plurality of receiving stations:
means for selectively connecting selected ones of said receiving stations to receive a message comprising a plurality of characters from said sending station;
means at said sending station for registering addresses for the receiving stations selected to receive said message; comprising a group of relays, one individual to each receiving station, and a first selective control unit for selectively energizing said relays;
means at each receiving station for sending a distinctive answer-back signal to the sending station to acknowledge that it has been connected to receive said message;
means at the receiving station for rendering the means for sending an answer-back signal at the receiving stations operative one at a time in response to receipt of successive characters of the message; and
means at the sending station operated under joint control of the registering means and answer-back signals for indicating the receiving stations which should have received characters of the message but did not receive them.

10. In a telegraph transmission system including a sending station and a plurality of receiving stations:
means for selectively connecting selected ones of said receiving stations to receive a message comprising a plurality of characters from said sending station;
means at said sending station for registering addresses of the receiving stations selected to receive said message comprising a group of registers, one individual to each receiving station, and a first selective control unit for selectively energizing said registers;
means at each receiving station for sending a distinctive answer-back signal to the sending station to acknowledge that it has been connected to receive said message;

means at the receiving station for rendering the means for sending an answer-back signal at the receiving stations operative one at a time in response to receipt of successive characters of the message;

means at the sending station operated under joint control of the registering means and answer-back signals for indicating which of the receiving stations has been connected to receive the message comprising, a second selective control unit for holding the energized ones of said group of registers energized and operable to release said registers in sequence in response to answer-back signals whereby unreleased registers will indicate the receiving stations which should have received characters of the message but did not receive them; and alarm means operated by said first selective control unit at the end of a message text for indicating registers that were not released by answer-back signals.

11. In a telegraph transmission system including a sending station and a plurality of receiving stations:

means for selectively connecting selected ones of said receiving stations to receive a message comprising a plurality of characters from said sending station;

means at said sending station for registering addresses of the receiving stations selected to receive said message comprising a group of registers, one individual to each receiving station, and a first selective control unit for selectively energizing said registers;

means at each receiving station for sending a distinctive answer-back signal to the sending station to acknowledge that it has been connected to receive said message;

means at the receiving station for rendering the means for sending an answer-back signal at the receiving stations operative one at a time in response to receipt of successive characters of the message;

means at the sending station operated under joint control of the registering means and answer-back signals for indicating which of the receiving stations has been connected to receive the message comprising, a second selective control unit for holding the energized ones of said group of registers energized and operable to release said registers in sequence in response to answer-back signals whereby unreleased registers will indicate the receiving stations which should have received characters of the message but did not receive them;

a second group of registers, one individual to each receiving station and paired with the registers in the first group of relays, and means in said second selective control unit for energizing those registers in the second group, in response to answer-back signals from receiving stations whose individual registers in the first group were not energized.

12. In a telegraph transmission system including communication channels interconnecting a sending station with a plurality of receiving stations and means for selectively enabling receiving stations to receive a message text; circuit assurance means comprising:

signal generators at the sending station and at the receiving stations, a pair of selective control units at the sending station one of which responds to signals generated at the sending station and the other of which responds to signals generated at all of the receiving stations, means controlled by said one selective control unit for registering the generation of each signal for enabling a receiving station, means controlled by the other of said selective control units for erasing the registrations, and means for sequentially initiating operation of the signal generators at the receiving stations, which have been enabled to receive the message text, during the transmission of the message text to operate said other selective control unit.

13. In a telegraph transmission system including communication channels interconnecting a sending station with a plurality of receiving stations and means for selectively enabling receiving stations to receive a message text; circuit assurance means comprising:

signal generators at the sending station and at the receiving stations;

a pair of selective control units at the sending station one of which responds to signals generated at the sending station and the other of which responds to signals generated at all of the receiving stations;

a group of selectively energizable devices at the sending station, one individual to each receiving station and energized by said one selective control unit for registering the generation of each signal for enabling a receiving station;

means controlled by the other of said selective control units for deenergizing said devices; and means for sequentially initiating operation of the signal generators at the receiving stations, which have been enabled to receive the message text, during the transmission of the message text to operate said other selective control unit.

14. In a telegraph transmission system including communication channels interconnecting a sending station with a plurality of receiving stations and means for selectively enabling receiving stations to receive a message text; circuit assurance means comprising:

signal generators at the sending station and at the receiving stations;

a pair of selective control units at the sending station one of which responds to signals generated at the sending station and the other of which responds to signals generated at all of the receiving stations;

a group of selectively activated devices at the sending station, one individual to each receiving station, and activated by said one selective control unit for registering the generation of each signal for enabling a receiving station;

means controlled by the other of said selective control units for deactivating said devices to indicate the enablement of the receiving station associated with each energized device in the first group;

means for sequentially initiating operation of the signal generators at the receiving stations, which have been enabled to receive the message text, during the transmission of the message text to operate said other selective control unit; and a second group of selectively activated devices, one individual to each receiving station, operated under joint control of the devices in the first group of devices and the other selective control unit, to indicate the enablement of the receiving stations whose devices in the first group have not been activated.

References Cited

UNITED STATES PATENTS 3,078,336 2/1963 Cameron ............. 178—3

THOMAS B. HABECKER, *Primary Examiner.*

U.S. Cl. X.R.

340—152